United States Patent [19]

Polak et al.

[11] 3,982,448
[45] Sept. 28, 1976

[54] INPUT-SPLIT HYDROMECHANICAL TRANSMISSION

[75] Inventors: James C. Polak, Indianapolis; Phillip J. Ross, Brownsburg, both of Ind.

[73] Assignee: General Motors Corporation, Detroit, Mich.

[22] Filed: Mar. 27, 1975

[21] Appl. No.: 562,808

[52] U.S. Cl. ................................................. 74/687
[51] Int. Cl.² ......................................... F16H 47/04
[58] Field of Search ..................... 74/687, 689, 690

[56] References Cited
UNITED STATES PATENTS

| 3,212,358 | 10/1965 | De Lalio | 74/687 |
| 3,470,769 | 10/1969 | Livezey | 74/687 |
| 3,592,077 | 7/1971 | Polak | 74/687 |
| 3,866,490 | 2/1975 | Orshansky, Jr. | 74/687 |
| 3,869,939 | 3/1975 | Miyao et al. | 74/687 |

Primary Examiner—John J. Vrablik
Attorney, Agent, or Firm—Donald F. Scherer

[57] ABSTRACT

A hydromechanical transmission in which the first and second drive ranges are input-split drives. In one embodiment the transmission includes a hydrostatic portion comprised of two hydraulically interconnected, variable displacement, hydraulic pump-motor units and two planetary gear sets which are controlled by a brake and a clutch to provide the two ranges. In another embodiment a third planetary gear set and a second clutch are added to provide increased torque coverage in first range and also provide a third drive range. In both embodiments the speed ratio within the drive ranges is varied by controlling the displacement ratio between the pump-motor units. The shifting from one drive range to another occurs at synchronous speeds, thereby reducing the shift energy absorption required in the clutches and brakes.

3 Claims, 8 Drawing Figures

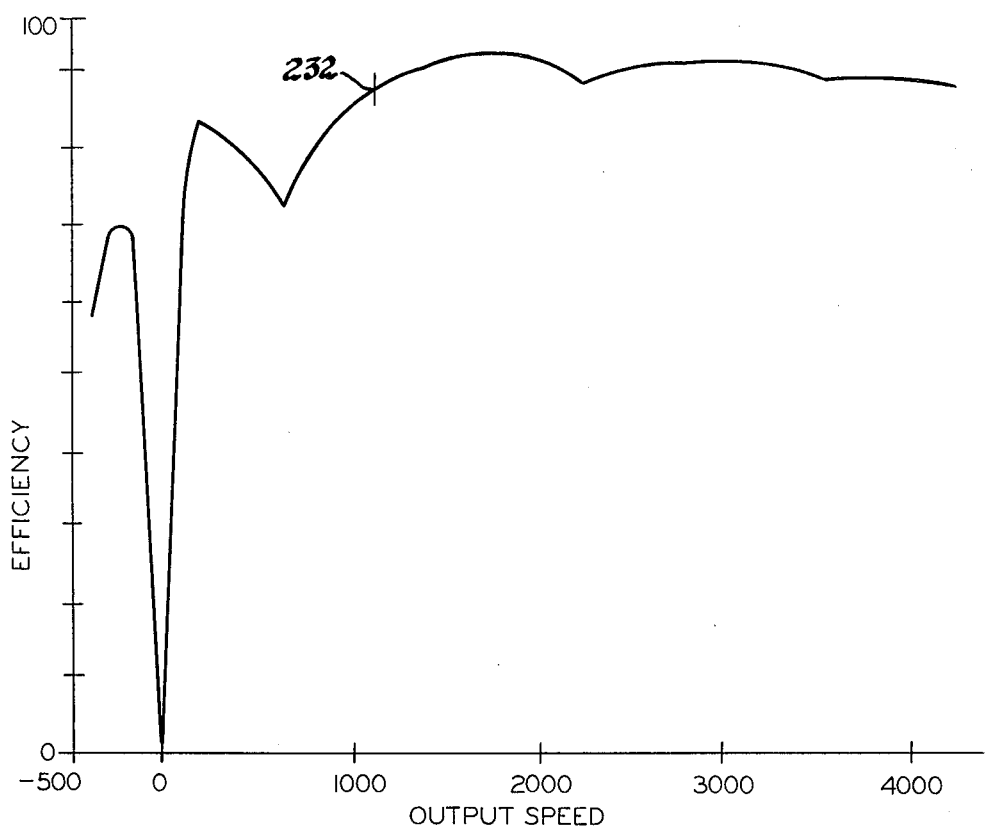
Fig.6
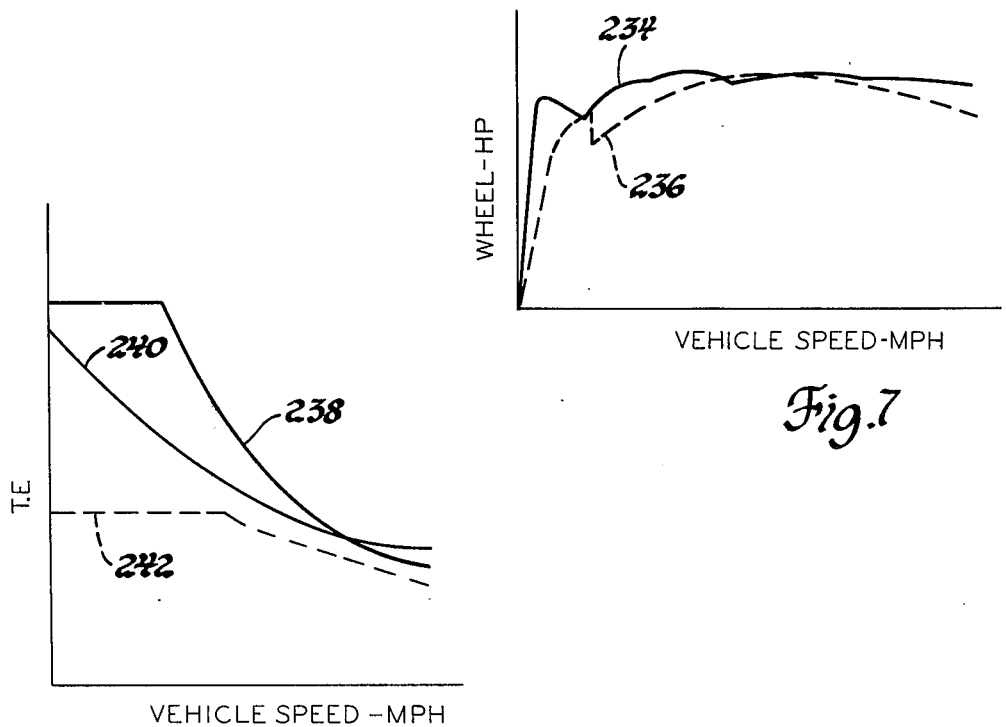
Fig.7
Fig.8

INPUT-SPLIT HYDROMECHANICAL TRANSMISSION

This invention relates to a hydromechanical power transmission and more particularly to hydromechanical power transmissions having two input-split drive ranges.

Hydromechanical transmissions provide a wide range of drive ratio coverage when using a single mechanical gear ratio. The total transmission coverage can be further expanded by including additional mechanical gear ratios. The transmission accomplishes this range of coverage by utilizing the variable ratio of a hydrostatic transmission combined with a mechanical gear ratio. Since the hydrostatic transmission is a positive type displacement unit, the drive ratio transmission from input to output may be controlled at any specific ratio within the drive range by controlling the displacement ratio of the hydrostatic units. On this basis, hydromechanical transmissions differ considerably from hydrodynamic transmissions which utilize slipping type fluid drive devices such as torque converters or fluid couplings.

The hydromechanical transmission can be designed such that one range, usually low range, is a full hydrostatic drive in which all input power is directed to the hydrostatic unit and the output power from the hydrostatic is directed through a mechanical gear arrangement to the transmission output. The hydromechanical transmission can also be designed such that the mechanical gearing arrangement is disposed in parallel power flow with the hydrostatic transmission. The connections between the transmission input, the hydrostatic transmission, the mechanical gearing arrangement, and the output shaft can be varied to provide an input-split drive, an output-split drive, or a compound-split drive. These various types of split powered drives are described in U.S. Pat. No. 3,470,769 issued to W. G. Livezey.

The present invention is concerned with an input-split type hydromechanical transmission wherein the input power is split between the hydrostatic unit and the mechanical gearing arrangement. The present invention provides, in one embodiment, two input-split drive ranges to accomplish high overall transmission efficiency and a wide range of transmission coverage. A second embodiment of the present invention provides first and second input-split type drive ranges and a third compound-split drive range which results in further transmission ratio coverage while maintaining high overall transmission efficiency.

It is an object of this invention to provide an improved hydromechanical transmission having first and second variable ratio drive ranges both of which provide input-split power flow.

Another object of this invention is to provide an improved hydromechanical transmission having a controllable hydrostatic portion and two controllable planetary gear sets for establishing two input-split drive ranges.

It is another ojbect of this invention to provide an improved hydromechanical transmission having a variable ratio hydrostatic transmission and three planetary gear sets in which each planetary gear set is controlled by a clutch, or brake to cooperate with the hydrostatic transmission portion to establish two input-split drive ranges, one compound-split drive range and increased torque coverage in the first range.

A further object of this invention is to provide an improved hydromechanical transmission in which an input planetary gear set is connected to the transmission input, each of the pump-motor units of a hydrostatic transmission, and is selectively connectable with the transmission output.

Another object of this invention is to provide an improved hydromechanical transmission in which an input planetary gear set has the carrier therefore drivingly connected to a pump-motor unit and the ring and sun gears of said set are connected to the transmission input member or to a second pump-motor unit such that with low speed prime movers the ring gear is connected to the transmission input and with high speed prime movers the sun gear is connected to the transmission input.

These and other objects and advantages of the present invention will be more apparent from the following description and drawings in which:

FIGS. 4 through 6 are graphs depicting the performance of a hydromechanical transmission designed in accordance with FIG. 3; and FIGS. 7 and 8 are graphs comparing the performance of the hydromechanical transmission shown in FIG. 3 with other types of transmissions.

Figure 1:
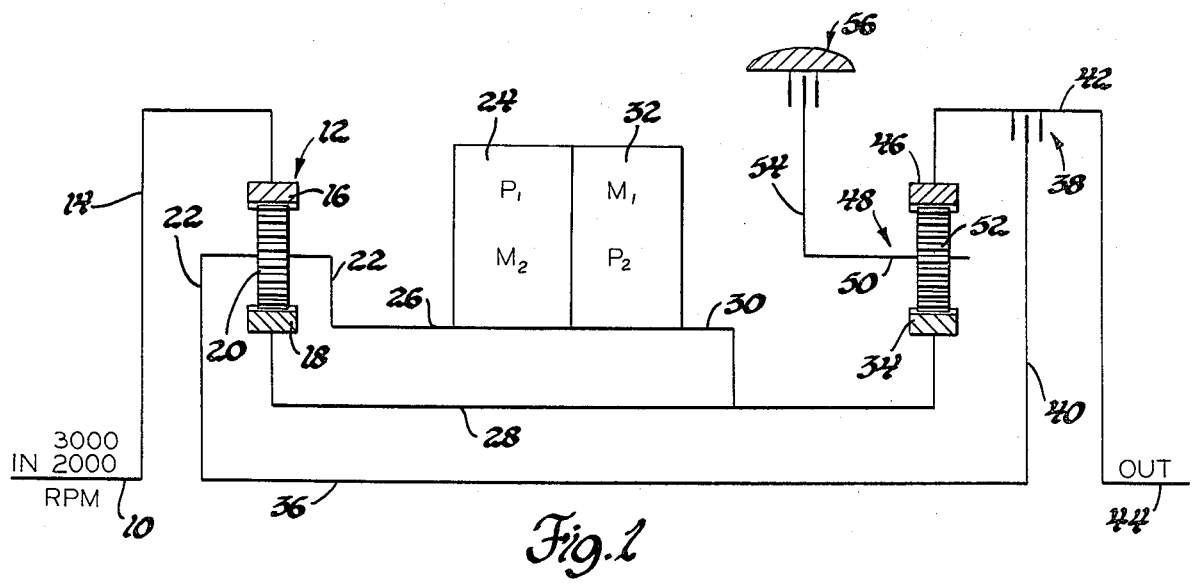
FIG. 1 is a schematic representation of a hydromechanical transmission embodying the present invention.

Referring to the drawings there is shown in FIG. 1 a transmission having an input shaft 10 which is drivingly connected to a planetary gear set 12 through a hub 14. The planetary gear set 12 includes a ring gear 16, a sun gear 18, pinion gears 20, meshing with the ring gear 16 and sun gear 18, and a planet carrier 22 on which the pinions 20 are rotatably mounted. The ring gear 16 is continuously drivingly connected to the hub 14, the carrier 22 is continuously drivingly connected to a pump-motor unit 24 through a drive shaft 26, and the sun gear 18 is continuously drivingly connected to an intermediate shaft 28. The intermediate shaft 28 is drivingly connected to a drive shaft 30, which is a component of another pump-motor unit 32, and is also drivingly connected to a sun gear 34.

The carrier 22 is continuously drivingly connected to an intermediate shaft 36 which is drivingly connected to a selectively operable clutch 38 through a hub 40. The clutch 38 has an output hub 42 which is connected to a transmission output shaft 44 and a ring gear 46. The sun gear 34 and ring gear 46 are components of a planetary gear set 48 which also includes a carrier 50 rotatably supporting a plurality of pinions such as 52 which mesh with the sun gear 34 and ring gear 46. The carrier 50 is drivingly connected to a hub 54 which forms portions of a selectively engageable fluid operated brake 56.

The pump motor units 24 and 32 are of the variable displacement type and are of conventional design. These pump motor units may be controlled in any conventional manner. The clutch 38 and brake 56 are friction drive establishing devices and are of conventional design and may be operated in any known manner, such as electrically, hydraulically, pneumatically, or mechanically. However, the clutch and brake are preferably hydraulically operated.

The pump-motors 24 and 32, or as they are more commonly called hydrostatic units, are combined to provide what is commonly termed a hydrostatic transmission. When operated as a hydrostatic transmission the displacements of the units are varied to control the speed ratio between the shafts 26 and 30. If, for example, shaft 26 is driven and the displacement of hydrostatic unit 24 is zero and the displacement of hydrostatic unit 32 is other than zero, the rotation of shaft 30 will be equal to zero. If under this condition the displacement of hydrostatic unit 24 is changed from zero, the hydrostatic unit 32 and therefore shaft 30 will be rotated due to the flow of hydraulic fluid between the units 24 and 32. The drive through the hydrostatic 24 and 32 can be in the opposite direction when the shaft 30 is driven. The direction of rotation of the shafts 26 and 30 can be varied by controlling the displacement change direction from neutral of either unit 24 or 32.

The hydromechanical transmission shown in FIG. 1 may be operated to provide an input-split first or low speed drive range and an input-split second or high speed drive range. The hydromechanical transmission will also provide a reverse drive range. The transmission shown in FIG. 1 is conditioned for neutral by disengaging both brake 56 and clutch 38 and placing the displacement of hydrostatic 24 at zero. To establish the first speed drive range the brake 56 is engaged. The output shaft 44 however will remain stationary at this point, since there is no fluid flow through the hydrostatic units and there is no reaction available for mechanical drive. To increase the speed of output speed 44 from zero, the displacement of hydrostatic unit 24 is increased from zero in a negative direction. The fluid delivered by hydrostatic unit 24 under this condition causes hydrostatic unit 32 and therefore shaft 30 to rotate in a negative direction, negative refers to the direction opposite to the input shaft rotational direction. The negative or reverse rotation of shaft 30 is imposed on sun gears 34 and 18. Driving of sun gear 34 in the reverse direction results in forward rotation of ring gear 46 and output shaft 44. The displacement of hydrostatic unit 24 also results in a reaction occurring in planetary gear set 12. As the displacement of hydrostatic unit 24 is increased, a portion of the input power is delivered through hub 14 and ring gear 16 to the carrier 22 in a forward direction and to the sun gear 18 in a reverse direction. The power delivered to carrier 22 is utilized to drive the hydrostatic unit 24 and the power delivered to sun gear 18, combined with the power from hydrostatic unit 32, is utilized to drive the sun gear 34. Thus the input power is split via the planetary gear set 12. The speed of output shaft 44 may be increased by further increasing the displacement of hydrostatic unit 24 until the hydrostatic unit 24 reaches maximum negative displacement. While the displacement of unit 24 is increased the power split through planetary gear set 12 changes such that a decreasing amount of power is transmitted hydraulically and an increasing amount of power is transmitted mechanically.

The speed of output shaft 44 may be further increased after hydrostatic unit 24 is at full displacement by decreasing the displacement of hydrostatic unit 32. As displacement of hydrostatic unit 32 is decreased, the speed of rotation of shaft 30 must increase to accommodate the relative increase in fluid flow to the unit 32. When the displacement of unit 32 has been decreased sufficiently, the ring gear 46 and carrier 22 will be rotating at the same speed. This is accomplished by judicious selection of the number of teeth on the carrier of the planetary gear sets 12 and 48 and the displacement ratio between the hydrostatic units 24 and 32. Since the carrier 22 and ring 46 are rotating at the same speed, the intermediate shaft 36, hub 40 and clutch hub 42 will be rotating at the same speed and in the same direction. Thus the clutch 38 can be engaged at what is termed a synchronized shift point and the brake 56 can be simultaneously disengaged. This conditions the transmission for the second or high speed range of operation.

To provide increase in the speed of output shaft 44 the displacement of hydrostatic unit 32 is increased toward its maximum value. In the second range of operation the input power is split between the carrier 22 and the sun gear 18 such that the power directed to carrier 22 is directed to the output shaft 44 through the clutch 38 and the power directed to sun gear 18 is directed to the hydrostatic unit 32. At this point the function of the hydrostatic units 24 and 32 is reversed. In first speed unit 24 operated as a pump while unit 32 operated as a motor. In the second range the unit 32 will operate as a pump and unit 24 is operated as a motor. The power directed to the hydrostatic unit 32 is delivered to the hydrostatic unit 24 which in turn transmits power through shaft 26 to the carrier 22 and hence output shaft 44 through clutch 38. To provide increased output speed in the second range the displacement of hydrostatic unit 32 is controllably increased to its maximum positive value. When the displacement of hydrostatic unit 32 is at its maximum positive displacement and the displacement of hydrostatic unit 24 is at its maximum negative displacement, their speeds will be equal and opposite. A further increase in the speed of output shaft 44 is provided by controllably decreasing the displacement of hydrostatic unit 24 toward zero displacement. As the displacement of hydrostatic unit 24 is moved toward zero, the speed of sun gear 18 will decrease thereby increasing the speed of carrier 22 which results in an increased output speed. When the displacement of hydrostatic unit 24 is equal to zero, the hydrostatic unit 32 can not be rotated, since no hydraulic fluid can be transmitted, and therefore the sun gear 18 will be stationary. At this point, the power transmission is essentially 100% mechanical through planetary gear set 12.

Further increase in the speed of output shaft 44 can be obtained by increasing the displacement of hydrostatic unit 24 in the positive direction. This will cause a power split in planetary gear set 17 such that a portion of the power directed to carrier 22 will be delivered to the output shaft 44 through clutch 38 and a portion will be delivered to the hydrostatic unit 24 through the shaft 26. As the hydrostatic unit 24 is driven in a forward direction with positive displacement the hydrostatic unit 32 and therefore shaft 30 and sun gear 18 will be driven in a positive direction. Thus the speed of carrier 22 will increase in a positive direction since the speed thereof is a function of the speed of ring gear 16 and sun gear 18 both of which are being rotated in the same direction. When the displacement of hydrostatic units 24 and 32 are equal, the planetary gear set 12 will rotate in a one to one condition such that output speed will be equal to input speed. A slightly further increase in transmission output speed can be occasioned by reducing the displacement of hydrostatic unit 32, which change will result in driving the sun gear 18 more rapidly than the ring gear 16 thus increasing the speed of the carrier 22. The speed of the output of the transmission can be reduced to the zero or neutral condition by reversing the operation described above.

The output shaft 44 can also be driven in the reverse direction by engaging the brake 56 and increasing the displacement of hydrostatic unit 24 in a positive direction which will result in positive rotation of sun gear 34. When the sun gear 34 is rotated in a positive direction, the ring gear 46 and therefor output shaft 44 will rotate in a negative or reverse direction as long as the carrier 50 is held stationary by the brake 56.

Figure 2:
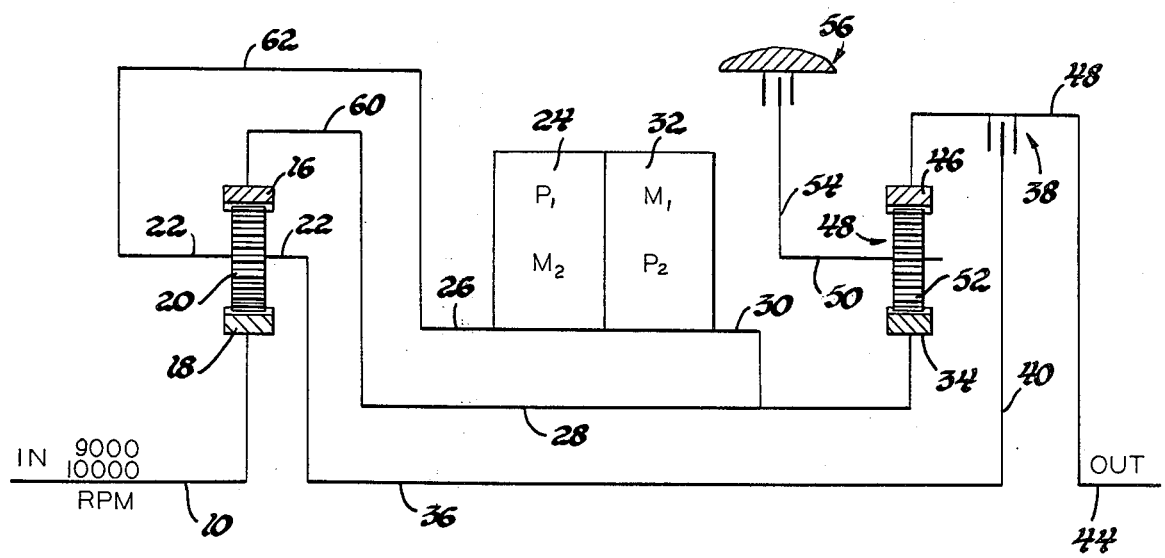
FIG. 2 is a schematic representation of a hydromechanical transmission incorporating a modification of FIG. 1.

The hydromechanical transmission shown in FIG. 2 is substantially identical with that shown in FIG. 1 except that the input shaft 10 is drivingly connected to the sun gear 18 while the ring gear 16 is drivingly connected through a hub 60 to the intermediate shaft 28. It should also be noted that the carrier 22 is drivingly connected through a hub 62 to the shaft 26 of hydrostatic unit 24. The remaining components of the transmission shown in FIG. 2 are identical with those shown in FIG. 1 and will therefor not be redescribed here. The drive connection changes which have been made in FIG. 2 permit a higher input speed to be utilized while the same output speed range coverage is maintained. Thus for example, in FIG. 1 the input shaft 10 can be driven by a covered prime mover which would operate at governed input speeds between 2000 and 3000 RPM. Thus the transmission shown in FIG. 1 could be utilized with an engine such as a diesel engine, while the transmission shown in FIG. 2 could be utilized with an engine such as a gas turbine engine.

Figure 3:
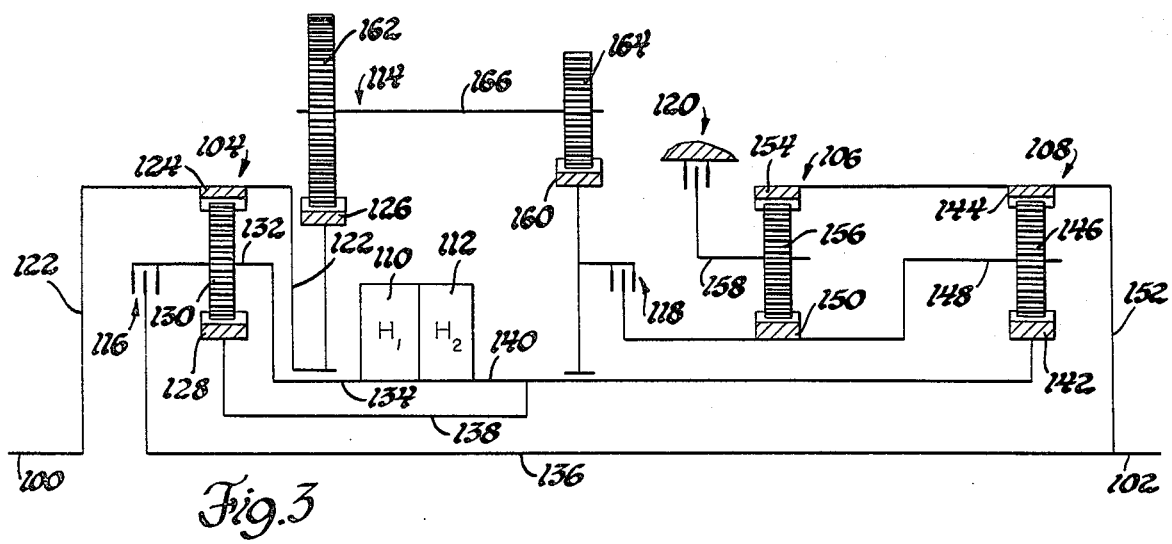
FIG. 3 is a schematic representation of a hydromechanical transmission depicting another embodiment of this invention.

The hydromechanical transmission arrangement shown in FIG. 3 is similar to the transmissions described above for FIGS. 1 and 2. The arrangement shown in FIG. 3 however includes a third planetary gear set which is combined with the hydrostatic portion of the transmission to provide an additional speed range, which in this instance is a compound-split speed range. The transmission shown in FIG. 3 has an input shaft 100 and an output shaft 102. This transmission also includes three planetary gear sets 104, 106, and 108, two hydrostatic units 110 and 112 which combine to form a hydrostatic transmission and a countershaft gearing arrangement 114. The transmission further includes two clutches 116 and 118 and a brake 120. The clutches 116, 118 and brake 120 may be constructed in any known manner and may be controlled in any known manner but are preferably hydraulically controlled. The hydrostatic units 110 and 112 also may be constructed in any known manner provided they are constructed as variable displacement type units, in particular, these units may be constructed in accordance with the teachings of U.S. Pat. No. 3,274,946.

The input shaft 100 is continuously drivingly connected through a hub 122 with a ring gear 124 and a spur gear 126. The ring gear 134 is a component in the planetary gear arrangement 104 and the spur gear 126 is a component in the countershaft gearing arrangement 114. The planetary gear set 104 also includes a sun gear 128 a plurality of pinion gears 130 and a planet carrier 132 which rotatably supports the planetary pinions 130 and is continuously drivingly connected to a shaft 134 which is the drive shaft for hydrostatic unit 110. The carrier 132 may also be selectively connected to a shaft 136 by the selectively engageable clutch 116. The sun gear 128 is drivingly connected through an intermediate shaft 138 with a drive shaft 140 of the hydrostatic unit 112. The drive shaft 140 and therefore sun gear 128 are also continuously drivingly connected to a sun gear 142 which is a component of planetary gear set 108.

Also included in planetary gearing 108 is a ring gear 144, a plurality of pinion gears 146 and a carrier member 148 which is drivingly connected to a sun gear 150 of planetary gear set 106. The ring gear 144 is drivingly connected through a hub 152 to the output shaft 102 and also to a ring gear 154 of the planetary gear set 106.

The planetary gear set 106 also has a plurality of pinions 156 which are rotatably supported on a carrier 158 which may be selectively held stationary by the brake 120. The sun gear 150 is drivingly connected to a member of the clutch 118 such that when the clutch 118 is engaged the sun gear 150 and carrier 148 are driven by a spur gear 160 which is also a component of the countershaft gearing arrangement 114.

The countershaft gearing arrangement 114 includes two spur gears 162 and 164 which are connected to rotate in unison with a shaft 166, which shaft 166 is rotatably supported in the transmission housing by bearings not shown. The gear 162 meshes with gear 126 and the gear 164 meshes with gear 160 such that the gear 160 is rotated in proportion to the speed input shaft 100 through the countershaft gear arrangement 114. The gear 126 is rotatably supported on shaft 134 and the gear 160 is rotatably supported on shaft 140 such relative rotation between these gears and their respective supporting members may be obtained.

The hydromechanical gearing arrangement shown in FIG. 3 is controlled to provide a first input-split speed range and a second input-split speed range similar to the transmission described above for FIG. 1. This arrangement however will also provide a third speed range which is a compound-split speed range.

The neutral condition for the transmission shown in FIG. 3 is accomplished in the same manner as described above for FIG. 1, that is hydrostatic unit 110 is at zero displacement and all of the clutches and brakes are disengaged. To establish the first or low forward speed range, the brake 120 is engaged. To provide an increase in the speed of output shaft 102 in the first speed range, the displacement of hydrostatic unit 110 is increased in a negative direction which results in reverse rotation, relative to the input shaft 100, of the shaft 140. This causes sun gear 142 to rotate opposite to input shaft 100 and since ring gear 144 is connected to the output shaft the carrier 148 will rotate in the reverse direction thereby driving sun gear 150 in the reverse direction. Reverse movement of sun gear 150 results in forward movement of the ring gear 154 and therefore output shaft 102 when the brake 120 is engaged. Sun gear 128 is related in the reverse direction and transmits a portion of input power from shaft 100 to sun gear 142. Thus in the first speed range power is split through the planetary gear set 104. The speed of output shaft 102 is increased in the first speed by increasing the displacement of hydrostatic unit 110 in a negative direction as shown by line 200 in FIG. 4. When the hydrostatic unit 110 has reached maximum negative displacement at point 202 in FIG. 4 the displacement of hydrostatic unit 112, as shown by line 204, is decreased resulting in a further increase in the speed of output shaft 102. As can be seen by lines 206 and 208 respectively, the speed of hydrostatic unit 112 increases in a negative sense and the speed of hydrostatic unit 110 decreases. At point 210, in FIG. 4, the maximum speed of the first speed range is reached and further increase in output shaft speed is accomplished by simultaneously engaging clutch 116 while disengaging brake 120.

Figure 4:
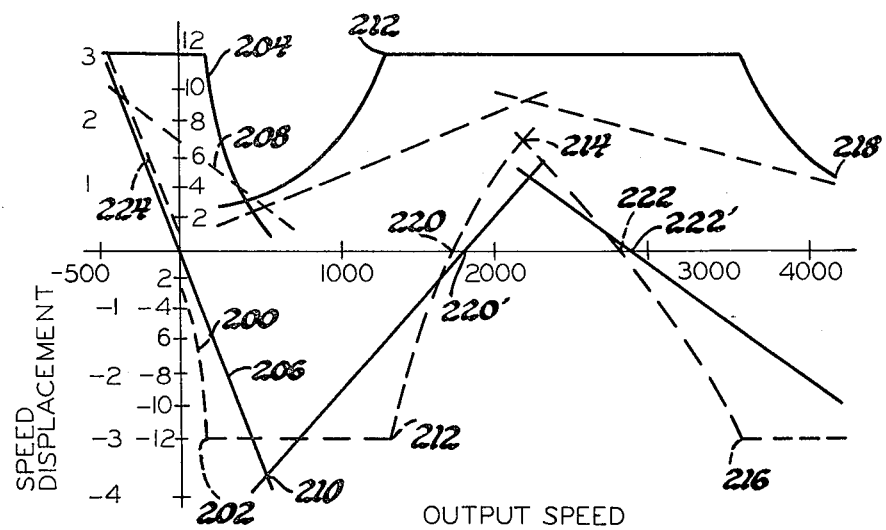

As can be seen from FIG. 4 after this synchronous shift has occurred the displacement of unit 112 is increased which results in a decrease in the speed of unit 112 and an increase in the speed of unit 110. At point 212 the displacement of unit 112 is maximum positive and the displacement of 110 is at a maximum negative. Further increase in the speed of output shaft 102 is accomplished by decreasing the displacement of unit 110 until the displacement thereof is equal to zero at which time a fully mechanical drive through planetary gear set 104 is acquired. In the second speed range, a further increase in output shaft speed can be accomplished by increasing the displacement of unit 110 until point 214 is reached. Up to this point the transmission shown in FIG. 3 is operated the same as the transmission described above for FIG. 1. That is the transmission has provided input-split power flow through the first and second ranges and also permitted a synchronous shift between the ranges. At point 214 in FIG. 4 the rotating components of clutch 118 are synchronized. This speed synchronization is accomplished by judicious selection of gearing components as is well known in the art. Therefore at this time clutch 118 can be engaged and the clutch 116 can be disengaged thereby conditioning the transmission for the third or high speed range.

In the third speed range, which is a compound-split speed range, input power is split by planetary gear set 104 between the sun gear 128 and the carrier 132. There is also a portion of the input power intermediate through the counter-shaft gearing arrangement 114 to the clutch 118 from which it is delivered to the planetary gear set 108 through the carrier 148. The input-split power from planetary set 104 is delivered to the sun gear 142 where it is combined with the power at carrier 148 to be delivered to the output shaft 102.

To provide an increase in the speed of output shaft in the third speed range, the displacement of the hydrostatic unit 110 is decreased from point 214, in FIG. 4, to a maximum negative displacement at point 216. A further increase in the speed of output shaft 102 is accomplished by decreasing the displacement of hydrostatic unit 112 to point 218 at which time the maximum output of the transmission occurs.

The output speed of the transmission can be reduced by reversing the operation of the hydrostatic units and the clutches and brakes at once again bring the output speed to zero if desired. It should be noted on FIG. 4 that at points 220 and 222 the displacement of hydrostatic unit 110 is zero. At these two points on the curve of FIG. 4 the speed of hydrostatic unit 112 is substantially zero and except for some leakage in the system would be exactly zero. At points 220' and 222' the speed of hydrostatic unit 112 is zero. At these points the power transmission is entirely mechanical and the hydrostatic units provide reaction only.

The transmission arrangement of FIG. 3 can also be operated in a reverse direction from neutral, by engaging brake 120 and increasing the displacement of hydrostatic unit 110 in a positive direction along line 224 of FIG. 4. This will result in the positive rotation of shaft 140 of hydrostatic unit 112, which will result in reverse rotation of output shaft 102 by action of the planetary gear sets 106 and 108.

Figure 5:
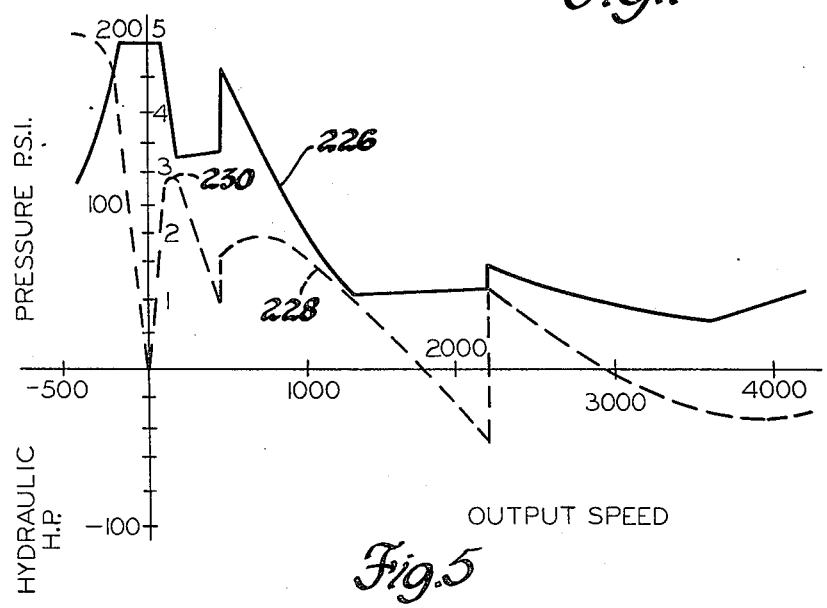

FIGS. 5 and 6 depicts to the operating characteristics of the transmission shown in FIG. 3. In particular curve 226 of FIG. 5 depicts the hydrostatic unit pressure versus transmission output speed. This pressure has a maximum value of 5000 PSI at zero output speed. The curve 228 depicts the hydraulic horespower which is utilized within the transmission and has a maximum value of approximately 120 horsepower at point 230. It should be noted from the curve of FIG. 5 that the hydraulic horsepower, assuming maximum horsepower to be 200, varies from zero (0) to a maximum of only 22% of total horsepower between output speed of 1000 to 4000 RPM.

The graph shown in FIG. 6 depicts the overall efficiency of a transmission designed in accordance with FIG. 3 and also that high overall efficiency can be expected with such a transmission. It should be noted that the overall efficiency varies only 3½% between point 232 and the maximum transmission output speed. This represents approximately 72% of the operating speed range of the transmission during which high overall efficiency is experienced.

FIGS. 7 and 8 represent a comparison between the performance of the transmission constructed in accordance with FIG. 3 and other well known transmissions. In FIG. 7 curve 234 represents the wheel horsepower versus vehicle speed of the vehicle employing the present invention whereas curve 236 represents another form of hydromechanical transmission. In particular the transmission represented by curve 236 would employ a hydrostatic first range and an input-split or output-split second speed range. These transmissions while they would have the same input horsepower, would have substantially different output powers and therefore different efficiency.

The curve shown in FIG. 8 represent the difference which can be attained in vehicle tractive effort between various transmissions. The curve 238 represents the tractive effort available with a transmission constructed in accordance with FIG. 3, the curve 240 represents the tractive effort provided by conventional hydrodynamic transmission and the curve 242 represents the tractive effort which can be obtained from the hydromechanical transmission utilizing a full hydrostatic first drive range. It should be pointed out that to attain the tractive effort depicted by curve 242, high system pressure, in excess of 6000 PSI, is required for forward operation while the tractive effort depicted by curve 238 can be obtained by a system pressure of less than 5000 PSI.

Obviously, many modifications and variations of the present invention are possible in light of the above teachings. It is, therefore, to be understood that within the scope of the appended claims the invention may be practiced otherwise than as specifically described.

What is claimed is:

1. A hydromechanical transmission, having first and second input-split drive ranges, comprising; input means; output means; variable ratio hydrostatic transmission means including first positive displacement pump-motor means having a drive shaft, and second positive displacement pump-motor means in fluid communication with said first-pump-motor means and having a drive shaft; first planetary gear means disposed in power flow relation between said input means and said first and second-pump motor means including a first member continuously connected to said input means, a second member continuously connected to said drive shaft of said first pump-motor means, and a third member continuously connected to said drive shaft of said second pump-motor means; selectively operable clutch means for selectively connecting said second member of said first planetary gear means and said output means; second planetary gear means including a first member continuously connected to said third member of said first planetary gear means, a second member continuously connected to said output means; and a third member; and means including selectively engageable friction drive establishing means for controlling the speed of said third member of said second planetary gear means, only said friction drive establishing means being engaged to established an input-split first drive range and only said clutch means being engaged to establish an input-split second drive range.

2. A hydromechanical transmission, having first and second input-split drive ranges, comprising; input means; output means; variable ratio hydrostatic transmission means including first and positive displacement pump-motor means having a drive shaft, and second positive displacement pump-motor means in fluid communication with said first pump-motor means and having a drive member of said second planetary gear means, only said friction drive establishing means being engaged to establish an input-split first drive range and only said clutch means being engaged to establish an input-split second drive range.

3. A hydromechanical transmission, having first and second input-split drive ranges, comprising; input means; output means; variable ratio hydrostatic transmission means including first positive displacement pump-motor means having a drive shaft, and second positive displacement pump-motor means in fluid communication with said first pump-motor means and having a drive shaft; first planetary gear means disposed in power flow relation between said input means and said first and second pump-motor means including a first member continuously connected to said input means, a second member continuously connected to said drive shaft of said first pump-motor means, and a third member continuously connected to said drive shaft of said second pump-motor means; first selectively operable clutch means for selectively connecting said second member of said first planetary gear means and said output means; second planetary gear means including a first member continuously connected to said third member of said first planetary gear means, a second member continuously connected to said output means; and a third member; third planetary gear means having a first member continuously drivingly connected to said third member of said second planetary gear means, a second member continuously drivingly connected to said output means, and a third member; second selectively operable clutch means for selectively connecting said first member of said third planetary gear means to said input means; and selectively engageable brake means for controlling the speed of said third member of said third planetary gear means, only said brake means being engaged to establish an input-split first drive range, only said first clutch means being engaged to establish an input-split second drive range, and only said second clutch means being engaged to establish a compound-split third drive range.

* * * * *

UNITED STATES PATENT OFFICE
CERTIFICATE OF CORRECTION

Patent No. 3,982,448               Dated September 28, 1976

Inventor(s) James C. Polak et al.

It is certified that error appears in the above-identified patent and that said Letters Patent are hereby corrected as shown below:

Column 2, line 9, "therefore" should read -- thereof --.

Column 4, line 53, "17" should read -- 12 --.

Column 5, line 59 "134" should read -- 124 --.

Column 9, line 22, the word "and " should be deleted.

Column 9, line 26, "member of said ... input-split second drive range." should be deleted, and inserted therefore -- shaft; first planetary gear means disposed in power flow relation between said input means and said first and second pump-motor means including a ring gear member continuously connected to said input means, a carrier member continuously connected to said drive shaft of said first pump-motor means, and a sun gear member continuously connected to said drive shaft of said second pump-motor means; selectively operable clutch means for selectively connecting said carrier member of said first planetary gear means and said output means; second planetary gear means including a sun gear member

UNITED STATES PATENT OFFICE
CERTIFICATE OF CORRECTION

Patent No. 3,982,448   Dated September 28, 1976

Inventor(s) James C. Polak et al.

It is certified that error appears in the above-identified patent and that said Letters Patent are hereby corrected as shown below:

continuously drivingly connected to said sun gear member of said first planetary gear means, a ring gear member continuously drivingly connected to said output means; and a carrier member; and means including selectively engageable brake means for controlling the speed of said carrier member of said second planetary gear means, only said brake means being engaged to establish an input-split first drive range and only said clutch means being engaged to establish an input-split second drive range. --

Signed and Sealed this

Nineteenth Day of April 1977

[SEAL]

Attest:

RUTH C. MASON
Attesting Officer

C. MARSHALL DANN
Commissioner of Patents and Trademarks